UNITED STATES PATENT OFFICE.

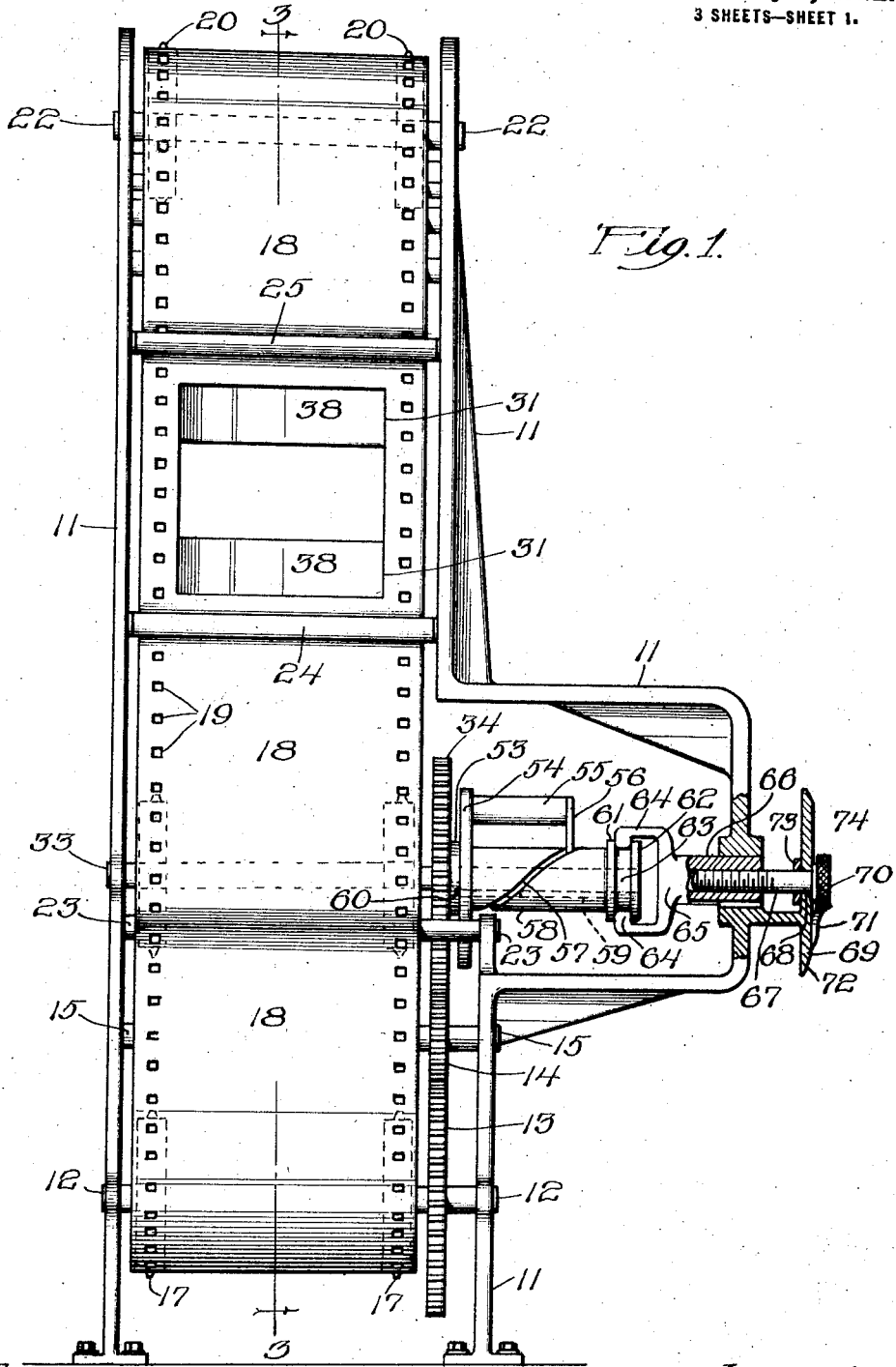

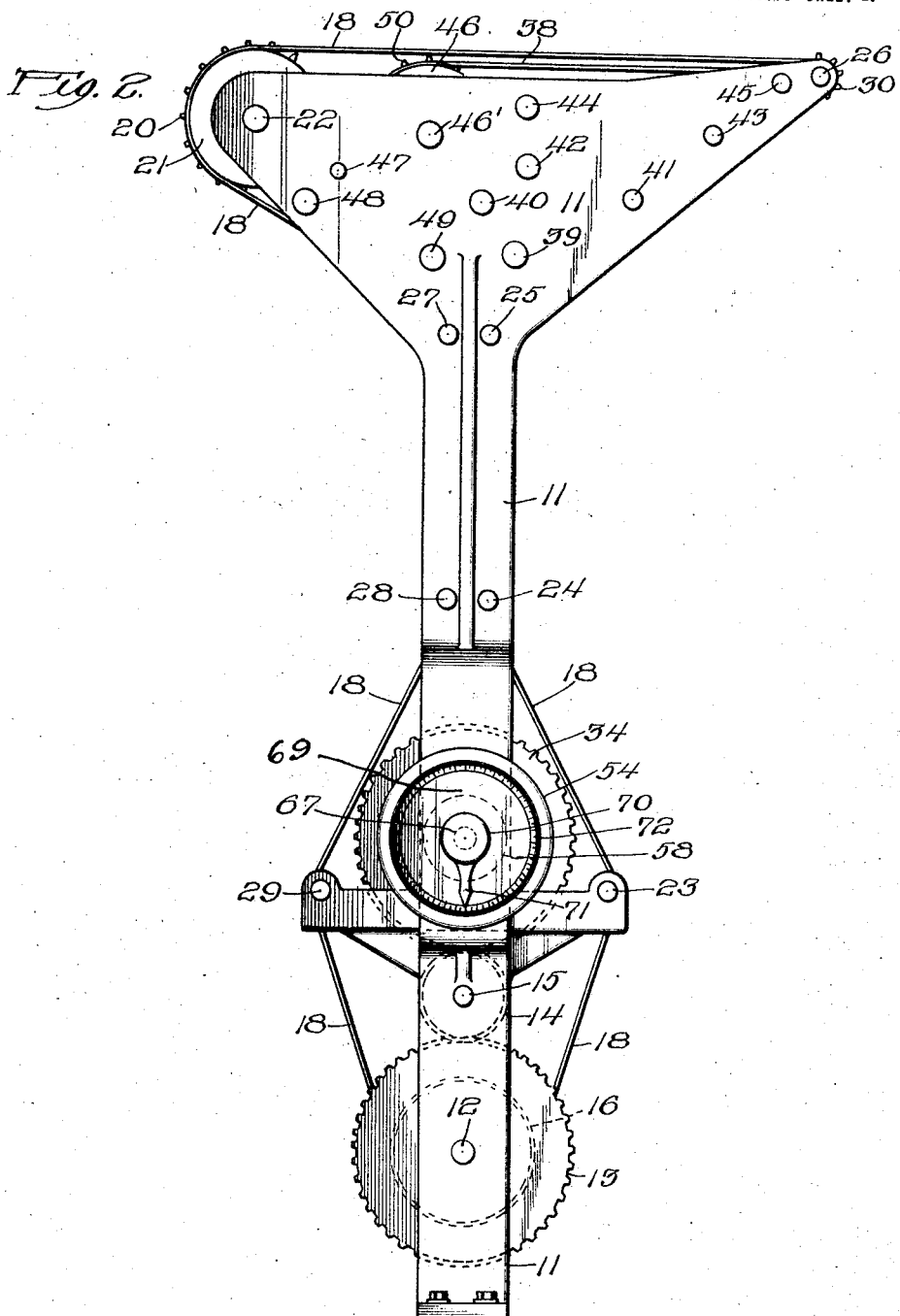

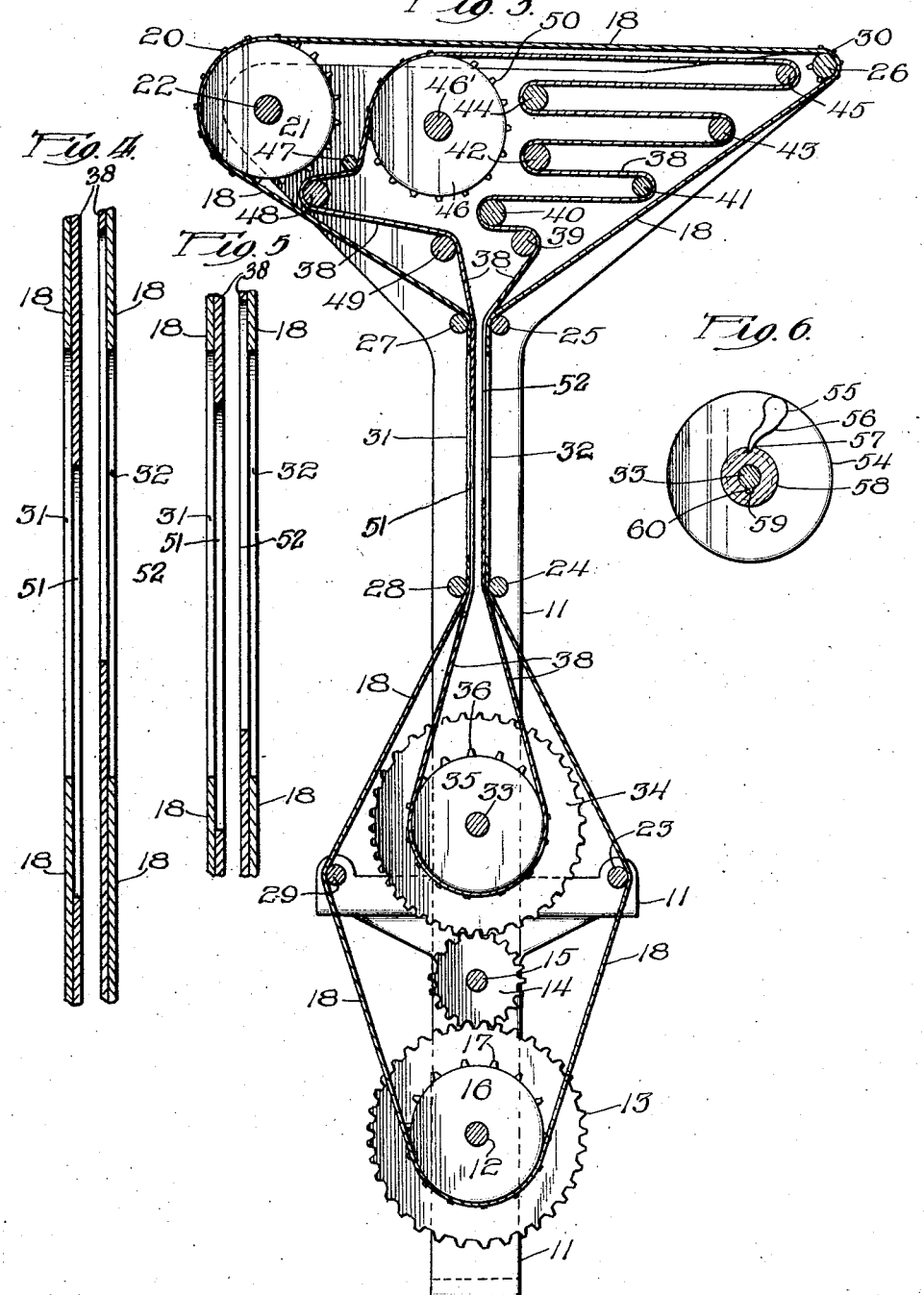

CHARLES H. GILL, OF CHICAGO, ILLINOIS, ASSIGNOR TO PAUL B. MALEBRANCHE, OF CHICAGO, ILLINOIS.

SHUTTER FOR MOTION-PICTURE APPARATUS.

1,414,942.　　　　Specification of Letters Patent.　　Patented May 2, 1922.

Application filed January 8, 1921. Serial No. 436,002.

*To all whom it may concern:*

Be it known that I, CHARLES H. GILL, a citizen of the United States, residing at Chicago, in the county of Cook and State of Illinois, have invented a new and useful Shutter for Motion-Picture Apparatus, of which the following is a specification.

My invention relates to motion picture apparatus wherein a shutter is employed to alternately prevent and permit light to pass from the lens to the sensitized film or from a picture carrying tape to the projecting screen. Specifically, my invention relates to shutters used for this purpose, whether in connection with cameras for taking motion pictures or with projecting machines for reproducing motion pictures. My shutter is of the curtain type, wherein apertures in moving curtains are caused to pass before the film or the picture carrying tape in such manner as to expose all of the surface of the said film or tape allotted to a single picture. Similar shutters have been used in still photography but have differed from my invention in that they depend upon the passage of an adjustable slit before the sensitized surface and expose only a portion of the same at a time, while my shutter acts similarly to the common at-the-lens type of shutter, exposing the whole picture at one time and opening and closing rapidly. Such a shutter, to be adapted to motion picture requirements, must be capable of regulation while its mechanism is rapidly operating. Thus, when this type of shutter is used for motion pictures, the operator could not increase or decrease the width of the aperture during operation of the apparatus to meet the varying needs arising from changes of light, subjects or distance from or speed of movement of the subjects. In other words, he could not regulate the amount of exposure which each individual picture is given without increasing or decreasing the number of pictures taken during each second of operation. He could operate the apparatus faster to expose more pictures in a given time and to expose each picture a correspondingly lesser time, or he could decrease the speed of the apparatus to make fewer exposures in a given time and correspondingly longer exposures of each picture, but he could not give longer or shorter exposures to the pictures while maintaining the same rate or number of exposures per second.

The objects of my invention are, first, to provide a curtain shutter wherein the aperture for the passage of light will open in one half the time usually required and will close with twice the rapidity of the ordinary shutter of this type; second, to provide means whereby the width of the said aperture and, consequently, the period of exposure of the pictures may be regulated at will; and, third, to provide means whereby this regulation may be achieved without interference with the steady operation of the apparatus at high speed.

I attain these objects by the mechanism illustrated in the accompanying drawings, in which—

Figure 1 is a front elevation of the mechanism with a portion of the frame in section; Figure 2 is a side elevation of the same; Figure 3 is a section taken on the line 3—3 of Figure 1; Figures 4 and 5 are detail sectional views of the curtains illustrating the manner of adjusting the apertures; and Figure 6 is a detail side and partly sectional view of the sliding sleeve and pawl device for regulating the size of aperture while the apparatus is in motion.

In the preferred construction illustrated, 11 represents a frame in which a shaft 12 is journaled. The shaft 12 has secured thereto a gear wheel 13 meshing with an idler gear wheel 14 secured to a shaft 15 journaled in the frame 11. A roller 16 having sprocket teeth 17 near each of its ends is also secured to the shaft 12 so that the roller 16 is rotatable with the shaft 12 and the gear wheel 13. A curtain 18 of flexible and opaque material has sprocket holes 19 along each of its edges adapted to mesh with the sprocket teeth 17 on the roller 16 and with the sprocket teeth 20 on a roller 21 secured upon a shaft 22 which is journaled in the frame 11. This curtain is journaled in the frame 11. This curtain 18 passes around the roller 16 with its sprocket holes 19 engaging the sprocket teeth 17 and then passes over the rollers 23, 24, 25, 26, 21, 27, 28 and 29, in the order designated, forming an endless belt. All of the rollers referred to are journaled in the frame 11 and all are smooth except 21 and 26 which are provided with sprocket teeth 20 and 30 to engage the sprocket holes 19 in the curtain 18.

The curtain 18 is provided with apertures or windows 31 and 32 so spaced apart that they will become opposite each other when one of the said apertures or windows is between the rollers 24 and 25 and when the other is between the rollers 27 and 28.

A shaft 33 is journaled in the frame 11 and has rotatably mounted upon it a gear wheel 34 which meshes with the idler gear wheel 14. A roller 35 is secured to the shaft 33 and this roller 35 is provided with sprocket teeth 36 near each of its ends adapted to engage with sprocket holes in a second curtain or endless belt 38 of flexible and opaque material, the said sprocket holes being spaced near each of the edges of the curtain 38 and throughout its length. This curtain 38 passes around the roller 35 with its sprocket holes engaging the sprocket teeth 36 on the roller 35. The curtain 38 then passes over the rollers 24, 25, 39, 40, 41, 42, 43, 44, 45, 46, 47, 48, 49, 27, and 28, in the order designated forming an endless belt. All of these rollers are journaled in the frame 11 and all are smooth surfaced except 46, which is supplied with sprocket teeth 50 near each of its edges to engage with the sprocket holes of the curtain 38.

The curtain 38 is provided with apertures or windows 51 and 52 so spaced apart that they will become opposite each other when one of the said apertures or windows is between the rollers 24 and 25 and when the other is between the rollers 27 and 28. Normally, the curtains 18 and 38 are so adjusted upon their respective systems of rollers that the apertures or windows of each curtain will be coincident with each other when between the rollers 24 and 25 and between the rollers 27 and 28. Each of these curtains is of the same exact length and, since each is driven at the same speed through the locking together of their respective systems by the idler gear 14, the apertures or windows will normally retain their positions in respect to each other.

The entire shutter mechanism is adapted to be driven by a source of rotary motion (not shown) engaging with the gear wheel 13.

The gear wheel 34, which is rotatable upon the shaft 33, is provided with a hub or collar 53 by which the gear wheel 34 and a disk 54 are secured together in such manner that both the gear wheel 34 and disk 54 are rotatable together upon the shaft 33. The disk 54 is provided with a projecting arm 55 upon the end of which is secured a shorter arm 56 adapted to have its free end travel in a spiral groove or channel 57 in a sleeve 58. This sleeve 58 surrounds the shaft 33 and is slidable longitudinally thereon but prevented from independent rotation thereon by a keyway 59 in said sleeve which is engaged by a key or feather 60 on the shaft 33.

The sleeve 58 has secured to it near one end two collars 61 and 62 spaced apart to form a channel 63 between them. Ends 64 of a fork element 65 fit into the channel 63 in such manner as to permit rotation of the sleeve 58 independently of the fork element 65 and of the slidable member 66 of which the fork element 65 is a part. This slidable member 66 is slidably mounted in the frame 11 and is internally threaded to receive a screw 67 which passes through an aperture 68 in an extension 69 of the frame 11. The screw 67 is provided with a milled head 70 for turning and this milled head 70 has secured thereto a pointer or hand 71 adapted to indicate on a dial 72 on the extension 69. This dial 72 may be graduated and have numerals spaced around it to indicate the proportion of opening of the light aperture to the focal length of the camera lens or projecting lens of the motion picture apparatus.

A collar 73 secured to the screw 67 prevents longitudinal movement of the said screw in one direction and another collar 74, which is similarly secured to the screw 67 prevents longitudinal movement of the said screw in the other direction. The pitch of the threads upon the screw 67 is such that one complete rotation of the said screw will draw the slidable member 66 and sleeve 58 their full distance of longitudinal travel.

In operation, this shutter mechanism is so connected by suitable gearing to the source of rotary motion driving the motion picture apparatus as to cause it to operate in synchonization with the mechanism for moving the picture tape or receiving tape but with a continuous motion and not with the intermittent motion of the tape. This difference in motion is best secured by having the gearing employed to transmit motion to the shutter lead from the source of motion before mechanism for making this motion intermittent in the tape moving gear train. The shutter is so synchronized with the said tape moving mechanism that the apertures or windows in the curtains 18 and 38 are caused to be between the rollers 24 and 25 and between the rollers 27 and 28 while the picture carrying or receiving tap is at rest, so that a passage for light is provided through the four apertures or windows of the said curtains at such time. Thus, the light will then be permitted to strike against that portion of the resting sensitized tape that may be opposite the said apertures or windows at such time or to pass out to the projection lens from the picture carrying tape through the said apertures or windows.

It will readily be seen that, as these apertures or windows pass out of juxtaposition through the continuous movement of the curtains on their rollers, the passage of light will be interrupted, and the synchronization of this shutter mechanism with the tape moving mechanism is such that the movement of another portion of sensitized tape to position for exposure or of another picture of the series carried by the exhibiting tape to position for exhibition or projection is accomplished during this period of light passage interruption. Thus, no matter at what speed the motion picture mechanism may be operated, the light passage will open during the rest interval of the tape and will be closed during the motion interval of the said tape. Furthemore, the passage will open very rapidly, with the opening beginning to appear at the center of the opening space and enlarging in each direction therefrom simultaneously, and it will close with equal rapidity from two directions, thus using the minimum of time for opening and closing and giving the maximum time for full opening.

To regulate the size of the light passage and, consequently, the proportionate amount of light permitted to pass through it during each exposure period, the curtain 38 is moved in relation to the curtain 18. Since the apertures or windows in each of these curtains are of the same size and shape, and since one of the windows of each curtain is exactly opposite the corresponding window of the other curtain when in exposing position, it will be evident that any movement of one curtain in its relation to the other curtain will cause the opening for light formed by the juxtaposed windows of the two curtains to be diminished in proportion as the curtains are moved out of their normal positions relative to each other.

This movement of the curtains relative to each other is secured by moving the curtain 38 and this is accomplished by turning the milled head 70 of the screw 67, which turns the pointer or hand 71 on the dial to indicate the relative positions of the two curtains. Since the screw 67 is held against longitudinal movement by the collars 73 and 74, the engagement of its threads with the internal threads of the slidable member 66 will cause rotation of the screw 67 to be translated into longitudinal sliding movement of the member 66 and of its fork element 65. The ends 64 of this fork element cause the sleeve 58 to move longitudinally with the slidable member 66 without interfering with the rotation of the sleeve 58. Since the gear wheel 34 is in mesh with the idler gear wheel 14, it cannot rotate independently of that idler or of the gear wheel 13, so this gear wheel 34 and its attached disk 54 are locked in the gear train, although loose on the shaft 33. The shaft 33 and roller 35 secured thereto are only locked to the gear wheel 34 and disk 54 by means of the engagement of one end of the short arm 56 with the spiral groove or channel 57 in the sleeve 58. As this sleeve 58 is rotatably secured to the shaft 33 by means of its keyway 59 and the key 60 on the shaft 33, the engagement of the arm 56 with the spiral groove 57 locks the disk 54 and gear wheel 34 to the shaft 33. When, however, the sleeve 58 is moved longitudinally upon the shaft 33, the spiral form of the groove 57 causes a movement of the shaft 33 and roller 35 relative to the gear wheel 34, and this relative movement of the roller 35 causes movement of the curtain 38 relative to the curtain 18.

It will be seen that this relative movement of the curtain 38 may be accomplished at the will of the operator, whether the motion picture apparatus is in operation or not, by merely turning the milled head 70 of the screw 67 until the pointer 71 indicates upon the dial 72 the exact degree of adjustment required. Thus, without interrupting the operation of the apparatus, the operator can immediately adjust this shutter to meet changing conditions of light, different subjects, different distances and rates of motion of the subjects.

Having thus fully described my invention, I claim:

1. In shutters for motion picture apparatus, the combination of an endless belt having windows spaced apart therein, means for regulating the degree of opening of said windows, and a normally stationary member movable to control the said means for regulating the degree of opening of said windows.

2. In shutters for motion picture apparatus, the combination of two endless belts having windows spaced apart therein and adapted to be coincident with each other at given portions of the revolutions of said endless belts, rollers mounting said endless belts, a support, and means mounted upon said support and non-rotatable with said rollers for changing the degrees of coincidence of said windows in each of said belts to the said windows in the other of said belts at will through manual actuation of said means.

3. In shutters for motion picture apparatus, the combination of an outer endless belt having windows spaced apart therein, an inner endless belt having windows spaced apart therein and adapted to be coincident with the said windows in the said outer endless belt, rollers independently mounting each of said belts, rollers mounting both of said belts, means for driving both of said belts in like direction and in unison with each other, means for moving one of said belts in either direction independently of the other of said belts and of the said driving means, and a control member non-rotatable in unison with the said belts or said rollers and adapted to actuate the said means for moving one of the said belts in either direction independently of the other of said belts.

4. In shutters for motion picture apparatus, the combination of an outer endless belt, an inner endless belt, rollers mounting each of said endless belts respectively, sprockets on each of said rollers adapted to engage the said belts, means for rotating the said rollers and driving the said belts in unison with each other, and a member slidable longitudinally of the axis of one of said rollers and adapted to rotate the said roller independently of the other of said rollers through the sliding movement of the said member.

CHARLES H. GILL.